US007673586B2

(12) United States Patent
Willinger et al.

(10) Patent No.: US 7,673,586 B2
(45) Date of Patent: Mar. 9, 2010

(54) BIRDCAGE ATTACHMENTS

(75) Inventors: Jonathan Willinger, Tenafly, NJ (US); Klaus Woltmann, Demarest, NJ (US); Ryan Rutherford, Belleville, NJ (US)

(73) Assignee: J.W. Pet Compnay, Inc., Teterboro, NJ (US)

(*) Notice: Subject to any disclaimer, the term of this patent is extended or adjusted under 35 U.S.C. 154(b) by 0 days.

(21) Appl. No.: 11/855,455

(22) Filed: Nov. 16, 2007

(65) Prior Publication Data

US 2008/0053378 A1 Mar. 6, 2008

Related U.S. Application Data

(60) Continuation-in-part of application No. 29/266,259, filed on Sep. 15, 2006, now Pat. No. Des. 586,957, which is a continuation-in-part of application No. 29/264,790, filed on Aug. 17, 2006, now Pat. No. Des. 554,298, which is a division of application No. 29/230,071, filed on May 16, 2005, now Pat. No. Des. 530,866, which is a division of application No. 29/180,987, filed on May 2, 2003, now Pat. No. Des. 508,589, which is a continuation-in-part of application No. 10/371,646, filed on Feb. 21, 2003, now Pat. No. 6,971,332, application No. 11/855,455, which is a continuation-in-part of application No. 29/230,071, filed on May 16, 2005, now Pat. No. Des. 530,866, which is a division of application No. 29/180,987, filed on May 2, 2003, now Pat. No. Des. 508,589, which is a continuation-in-part of application No. 10/371,646, filed on Feb. 21, 2003, now Pat. No. 6,971,332, application No. 11/855,455, which is a continuation-in-part of application No. 11/245,556, filed on Oct. 7, 2005, now abandoned, and a continuation-in-part of application No. 11/182,380, filed on Jul. 15, 2005, now abandoned, which is a continuation of application No. 10/371,646, filed on Feb. 21, 2003, now Pat. No. 6,971,332.

(60) Provisional application No. 60/844,468, filed on Sep. 14, 2006, provisional application No. 60/370,200, filed on Apr. 5, 2002.

(51) Int. Cl.
*A01K 39/014* (2006.01)
*A01K 31/06* (2006.01)

(52) U.S. Cl. .................. 119/466; 119/464; 119/477; 119/57.8

(58) Field of Classification Search ............... 119/459, 119/466, 57.8, 51.03, 467, 477, 464, 475, 119/52.2, 72

See application file for complete search history.

(56) References Cited

U.S. PATENT DOCUMENTS 804,907 A 11/1905 Whitfield (Continued)

FOREIGN PATENT DOCUMENTS

FR 2529751 1/1984

(Continued)

*Primary Examiner*—Son T. Nguyen
(74) *Attorney, Agent, or Firm*—Katten Muchin Rosenman LLP (57) ABSTRACT

A birdcage accessory for holding food items is configured with a body and a perch displaceably mounted to the body to adjust its position relative to variously shaped and dimensioned food items.

14 Claims, 11 Drawing Sheets

U.S. PATENT DOCUMENTS

| | | | |
|---|---|---|---|
| 811,870 A | 2/1906 | Quittner | |
| 1,192,441 A | 7/1916 | Lydecker | |
| 1,446,740 A | 2/1923 | Eummelen | |
| 1,450,494 A | 4/1923 | Eummelen | |
| 1,530,657 A | 3/1925 | Eummelen | |
| 1,632,380 A | 6/1927 | Marcus | |
| 1,718,432 A | 6/1929 | Qualmann | |
| 1,755,706 A | 4/1930 | St. George | |
| D89,923 S | 5/1933 | Robison | |
| 2,031,874 A | 2/1936 | Butler et al. | |
| 2,066,264 A | 12/1936 | Fisher | |
| 2,174,725 A | 10/1939 | Hutaff, Jr. | |
| D128,779 S | 8/1941 | Hallenscheid | |
| 2,296,000 A | 9/1942 | Ojalvo | |
| 2,483,003 A | 9/1949 | Fischer | |
| 2,531,915 A | 11/1950 | Maly | |
| D162,959 S | 4/1951 | Janes et al. | |
| D164,692 S | 10/1951 | Kelley | |
| D166,334 S | 4/1952 | Moon | |
| D167,326 S | 7/1952 | Verosub et al. | |
| 2,699,752 A | 1/1955 | Reyes | |
| D174,580 S | 4/1955 | Kiehl | |
| 2,707,937 A | 5/1955 | Herman | |
| 2,731,949 A | 1/1956 | Arnold | |
| 2,800,105 A | 7/1957 | Ilg | |
| 2,808,807 A | 10/1957 | Winton et al. | |
| 2,828,963 A | 4/1958 | Steiner | |
| 2,943,600 A | 7/1960 | Rosoff | |
| 3,017,589 A | 1/1962 | Chass | |
| D197,758 S | 3/1964 | Schreckengost | |
| 3,181,504 A | 5/1965 | Stoltz | |
| 3,185,133 A | 5/1965 | Bird | |
| D208,410 S | 8/1967 | Jacobsen | |
| D210,567 S | 3/1968 | Stanziale | |
| D212,111 S | 8/1968 | Zaretsky | |
| D221,387 S | 8/1971 | Bacon | |
| 3,667,714 A | 6/1972 | Ziaylek, Jr. | |
| 3,678,901 A | 7/1972 | Dulle | |
| 3,707,949 A | 1/1973 | Lippi | |
| 3,815,282 A | 6/1974 | Frost | |
| D233,386 S | 10/1974 | Hammett | |
| 3,911,866 A | 10/1975 | Dodd | |
| D249,566 S | 9/1978 | Wilhelm | |
| 4,188,745 A | 2/1980 | Harvey et al. | |
| D274,013 S | 5/1984 | Sun | |
| 4,450,789 A | 5/1984 | Nilsen et al. | |
| 4,542,714 A | 9/1985 | Ingraham et al. | |
| 4,574,738 A | 3/1986 | Tominaga | |
| 4,634,089 A | 1/1987 | Wright et al. | |
| 4,655,723 A | 4/1987 | Marason et al. | |
| 4,732,112 A | 3/1988 | Fenner et al. | |
| 4,762,086 A | 8/1988 | Atchley | |
| 4,895,109 A | 1/1990 | De Groot et al. | |
| 5,018,480 A | 5/1991 | Goldman et al. | |
| 5,022,345 A | 6/1991 | Bolivar et al. | |
| 5,033,708 A * | 7/1991 | Brue et al. | 248/309.2 |
| D333,071 S | 2/1993 | Lim | |
| 5,232,137 A * | 8/1993 | Devine | 224/666 |
| 5,301,634 A * | 4/1994 | Ho | 119/477 |
| D347,957 S | 6/1994 | Kea | |
| 5,351,645 A | 10/1994 | Brennon | |
| D352,575 S | 11/1994 | Bransky et al. | |
| D353,693 S | 12/1994 | Lawson | |
| D355,732 S | 2/1995 | Huff | |
| 5,397,033 A | 3/1995 | Blomquist | |
| D358,967 S | 6/1995 | Knighton | |
| D371,226 S | 6/1996 | Lee | |
| D371,227 S | 6/1996 | Lee | |
| 5,612,500 A | 3/1997 | Liang | |
| 5,699,752 A | 12/1997 | Wilkins | |
| D393,108 S | 3/1998 | Atchley | |
| D407,952 S | 4/1999 | Kendrick | |
| 5,893,338 A | 4/1999 | Campbell et al. | |
| 5,949,456 A | 9/1999 | Matsumoto et al. | |
| D430,326 S | 8/2000 | Littman | |
| 6,170,518 B1 * | 1/2001 | Ratelle | 137/376 |
| 6,189,489 B1 | 2/2001 | Pearce | |
| 6,308,657 B1 | 10/2001 | Schumacher et al. | |
| 6,374,772 B1 | 4/2002 | Brandt | |
| 6,408,788 B1 | 6/2002 | Lieb et al. | |
| 6,457,439 B1 | 10/2002 | Engelking | |
| 6,561,129 B1 | 5/2003 | Cheng | |
| D486,682 S | 2/2004 | Zins et al. | |
| 6,736,088 B1 | 5/2004 | McGregor et al. | |
| 6,883,766 B1 * | 4/2005 | Ziaylek et al. | 248/313 |
| 7,392,763 B2 | 7/2008 | Willinger et al. | |
| 2004/0108337 A1 | 6/2004 | Makino et al. | |
| 2005/0028749 A1 | 2/2005 | Willinger et al. | |

FOREIGN PATENT DOCUMENTS

FR            2561867        10/1985

* cited by examiner

BIRDCAGE ATTACHMENTS

RELATED APPLICATIONS

This application is a continuation-in-part application of and claims priority to U.S. Ser. No. 60/844,468, filed on Sep. 14, 2006, which is pending and hereby is incorporated by reference for all purposes.

This application is a continuation-in-part application of and claims priority to U.S. Ser. No. 29/266,259 filed on Sep. 15, 2006 now U.S. Pat. No. Des. 586,957, which hereby is incorporated by reference for all purposes. U.S. Ser. No. 29/266,259 is a continuation-in-part application of Ser. No. 29/264,790 filed on Aug. 17, 2006 now U.S. Pat. No. Des. 554,298 which is a divisional of U.S. application Ser. No. 29/230,071 filed on May 16, 2005 now U.S. Pat. No. Des. 530,866 which is a divisional application of Ser. No. 29/180,987, filed on May 2, 2003, now U.S. Pat. No. D508,589, which is a continuation-in-part of U.S. application Ser. No. 10/371,646 filed Feb. 21, 2003, now U.S. Pat. No. 6,971,332 and published as U.S. Patent Publication 2003/0188696, which claimed the benefit of U.S. Provisional Application 60/370,200 filed Apr. 5, 2002.

This application is a continuation-in-part application of and claims priority to U.S. application Ser. No. 29/230,071 filed on May 16, 2005 now U.S. Pat. No. Des. 530,866, which is a divisional application of Ser. No. 29/180,987, filed May 2, 2003, now U.S. Pat. No. D508,589, which is a continuation-in-part of U.S. application Ser. No. 10/371,646 filed Feb. 21, 2003, now U.S. Pat. No. 6,971,332 and published as U.S. Patent Publication 2003/0188696, which claimed the benefit of U.S. Provisional Application 60/370,200 filed Apr. 5, 2002.

This application is a continuation-in-part application of and claims priority to U.S. Ser. No. 11/245,556 filed on Oct. 7, 2005 now abandoned, and claims the benefit of U.S. Ser. No. 29/230,071.

This application is a continuation-in-part application of and claims priority to U.S. Ser. No. 11/182,380 filed on Jul. 15, 2005 now abandoned, and which is a continuation of U.S. application Ser. No. 10/371,646 filed Feb. 21, 2003, now U.S. Pat. No. 6,971,332 and published as U.S. Patent Publication 2003/0188696, which claimed the benefit of U.S. Provisional Application 60/370,200 filed Apr. 5, 2002.

All Applications are herein incorporated by reference for all purposes.

BACKGROUND OF THE INVENTION

1. Field of the Invention

The invention relates to birdcage attachments and toys, and more particularly to birdcage attachments for providing food.

2. Description of the Related Art

Birds spend the majority of their time standing on their feet so configuration and location of perches essential. It is particularly important to locate perches associated with the food holders and water cups to have caged birds feel comfortable while eating and drinking. If the location of perches relative to the food holders and water cups is somewhat inconvenient for a caged bird, it may stop eating/drinking and exhibit unusual behavior. Although such behavior is easily perceived and understood by a bird owner, its remedies are somewhat more difficult in practice.

Often changing the location of the perch relative to the food holder and/or water cup may minimize the anxiety of a caged bird. However, many of the known food holders and water cups have a complicated perch attachment assembly requiring the bird owner to have trouble readjusting the position of the perch.

Feeding birds also poses a sanitation problem. It is common to see food debris and food fragments falling outside the cage. One reason is the position of a perch. Still another reason is the configuration of feeders and water cups. The feeders and water cups are usually configured for a "typical" cage bird. However, the size and habitual characteristics of the birds are vastly different and, thus, essential to the optimal design of these attachments. If properly dimensioned and shaped for a given bird species, the feeders and water cups may provide at least a partial solution to sanitation problems.

The significance of clean feeders and water cups is well known. However, due to structural inadequacies of at least some of the known accessories, the pet owner may have trouble in replacing food or water. Left in a feeder for a prolonged period of time, old food fragments accumulate and further contribute to dirtying the floor in the vicinity of the cage. Furthermore, food does not come in uniform sizes and shapes. However, many of the known feeders cannot be adjusted do accommodate a variety of sizes. If, for example, a treat stick is not reliably held in a feeder, the bird may inadvertently throw it away outside the cage.

A need, therefore, exists for bird attachments that include a simple and reliable attachment for a perch.

Another need exists for bird attachments that have a configuration minimizing debris, i.e. polluting the environment, near the bird cage.

Still another need exists for bird attachments that have a configuration with a simple and adjustable holder capable of reliably securing differently sized food items in the feeder and providing an easy access for the pet owners to bird feeders and water cups.

SUMMARY OF THE INVENTION

These needs are met by the disclosed birdcage accessory configured, for example, as a cuttlebone holder or a treat stick holder. The holders are particularly suitable for holding differently sized and shaped cuttlebones and treat sticks for parakeets, canaries, cockatiels, and finches.

In accordance with one aspect of the disclosure, a treat stick holder has an elongated body configured to receive variously dimensioned treat sticks. The opposite elongated flanks of the body have respective tracks extending along a portion of the body. A perch is slidably mounted to the opposite tracks to move therealong in response to a thrust applied by the operator. As the bird consumes one area of a treat stick, the operator may gradually move the perch along the tracks to make a new area available. As a result, it is easy to establish the desired position of the perch in which the bird can easily reach for the treat stick.

Displacement of the perch along the tracks also minimizes debris near the cage. As the caged bird continues eating the treat stick, the movable perch provides the bird with comfortable positioning of its body relative to the treat stick and less food debris ending up on the floor in the vicinity of the cage. Accordingly, fewer fragments of the treat stick end up outside the cage as the bird chews on the treat stick.

Furthermore, displacing the perch along the tracks provides the operator with an easy access to the feeder. This is particularly important when the operator, for example, cleans up the body of the treat stick.

In accordance with another aspect, the bottom of the body is shaped and dimensioned to improve trapping at least part of food fragments that still may fly off the holder's body as the bird chews a treat stick. Particularly, the shape, width, and depth of the bottom were subjected to extensive experimentation the results of which are disclosed hereinbelow and have been found to maximize the trapping capability of the holder.

According to still another aspect, the utility of the disclosed treat stick holder is further improved by providing its body with a means for holding a variety of toys or other types of food holders, such as a millet spray holder. In particular, the top of the treat stick holder is provided with a coupler that can be removably attached to a coupler provided on the millet spray holder. In a further aspect, a cuttlebone holder is configured with a bone holder configured to reliably hold variously sized and shaped bones within the cuttlebone holder. In particular, the cuttlebone holder has a body provided with a pair of spaced apart tracks supporting the respective opposite ends of the bone holder. One of the opposite ends is rotatably coupled to a respective one of the tracks, whereas the other track is detachably coupled to the other end of the bone holder. The other end of the bone holder is adjustable to allow the operator to vary the effective length of the bone holder relative to the bone to prevent the latter from undesirable displacement in the body regardless of the bone's size and shape.

The above and other features and advantages of the present disclosure will be discussed in conjunction with the following drawings.

DETAILED DESCRIPTION

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "attach," "connect," "couple," and similar terms with their inflectional morphemes do not necessarily denote direct and immediate connections, but also include connections through mediate elements or devices.

Figure 1:
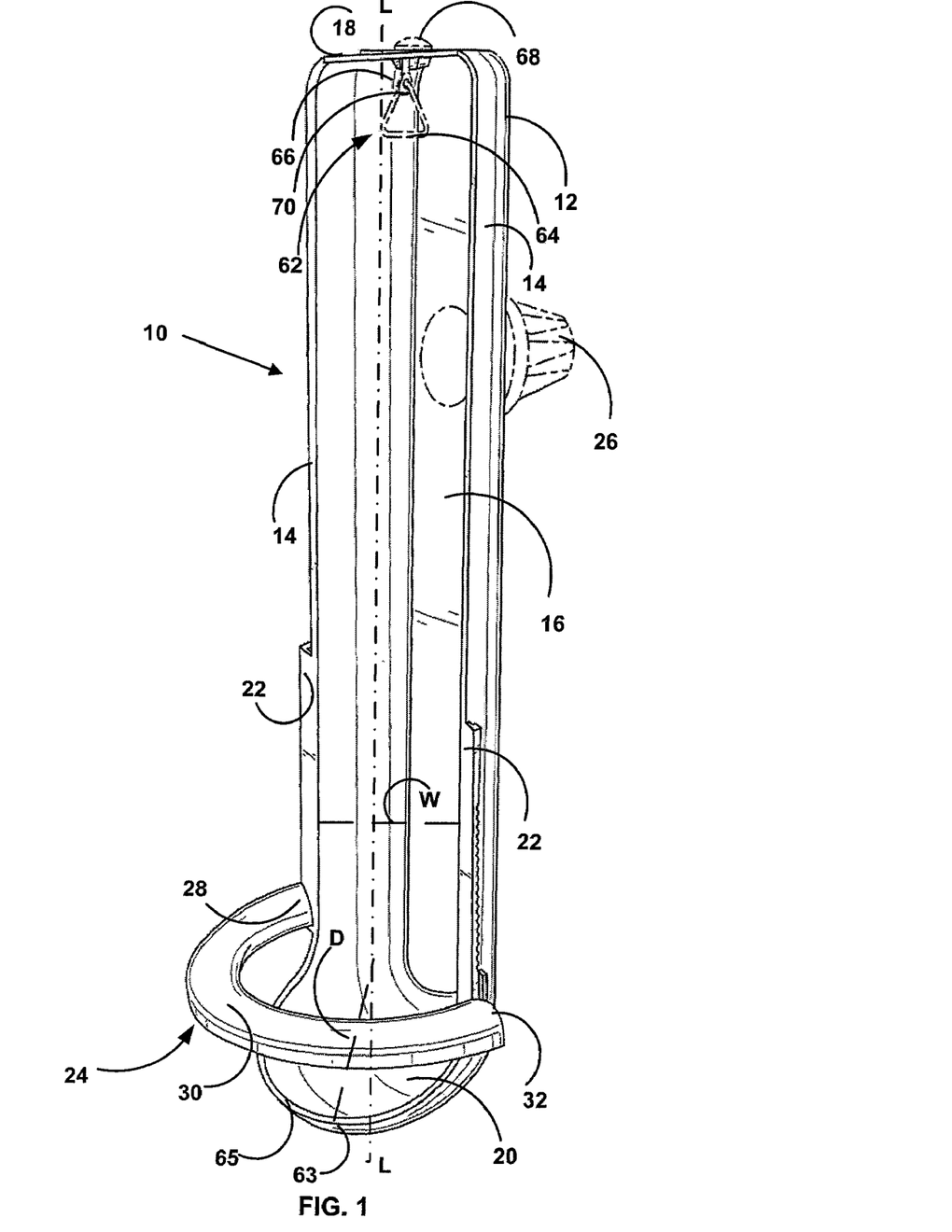
FIG. 1 is a perspective view of a treat stick holder with a position adjustable perch shown in one of the opposite extreme positions in accordance with one embodiment of the present invention.
Figure 2:
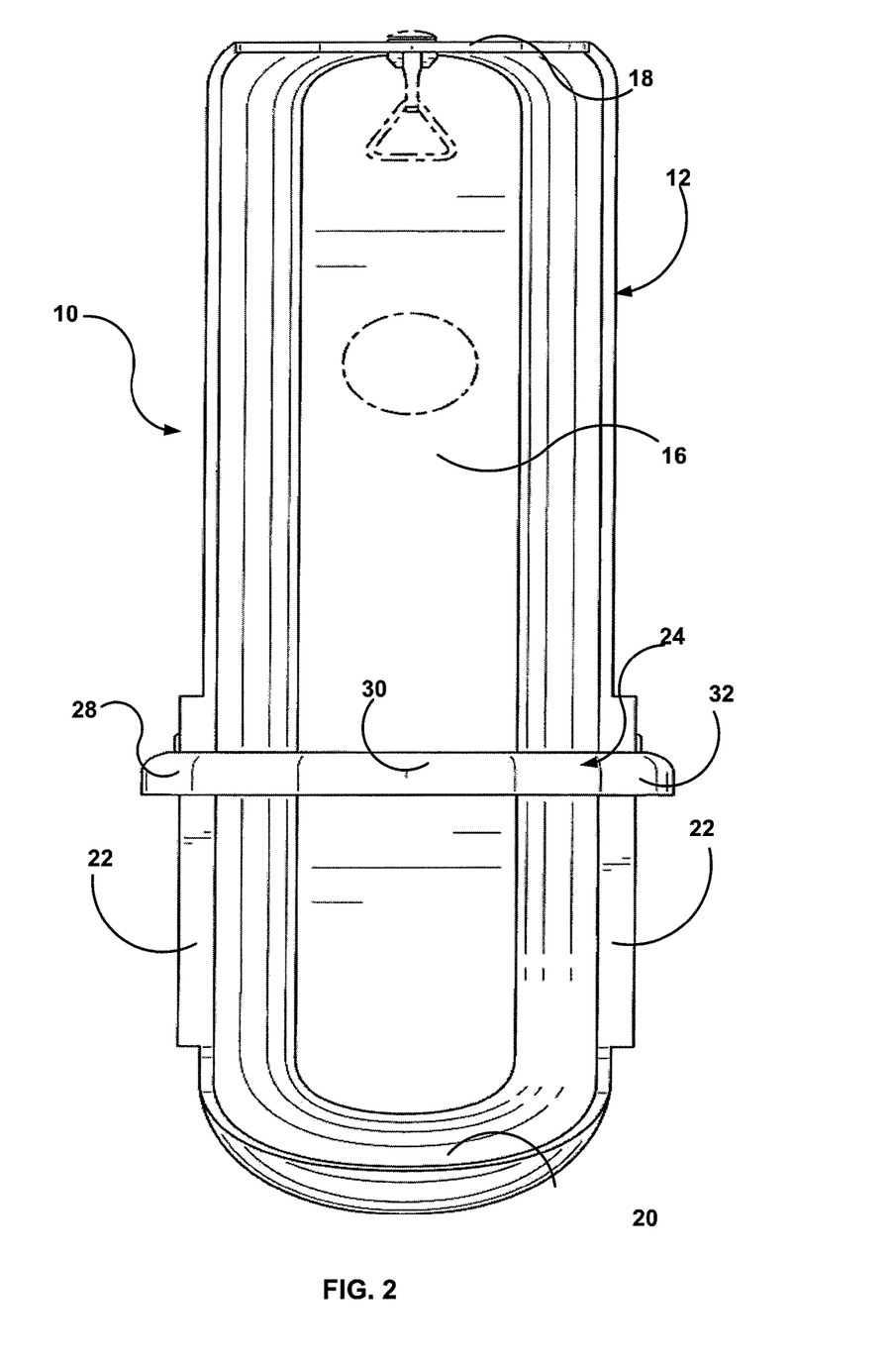
FIG. 2 is a plain front view of the treat stick holder of FIG. 1 with the adjustable perch shown in the other extreme position.

FIGS. 1 and 2 illustrate a birdcage accessory configured as a treat stick holder 10. The holder 10 has an elongated body 12 that is shaped and dimensioned to receive a treat stick (not shown). The body 12 is formed with a continuous peripheral wall extending angularly outwards from a bottom 16. The peripheral wall includes a pair of opposite elongated flanks 14, and spaced apart top and bottom ends 18, 20 respectively.

The flanks 14 have respective tracks 22 extending laterally outwards from the edge of body 12 and along respective portions of the flanks that longitudinally extend from bottom end 20 and terminate at a distance from top end 18. Bridging tracks 22 is a perch 24 configured to provide a support for the caged bird. The perch 24 is slidably guided along tracks 22 in response to a thrust produced by the operator. The displacement of perch 24 allows the operator to set the desired position of the perch corresponding to an area of the treat stick that is to be consumed.

When a new treat stick is placed within body 12, its length may extend along the entire length of the body, and perch 24 may be moved to its lowest position as illustrated in FIG. 2. As one area of the treat stick is consumed, perch 24 can be displaced along a different position, as illustrated in FIG. 1.

In addition, perch 24 is removably mounted to tracks 22 and, thus, can be easily dismounted to provide the access to the interior of body 12, which is helpful, for example, when the operator is cleaning body 12 or replacing a treat stick. The perch 24, preferably, is a semi-circular body with a curved central web 30 having opposite ends 28 and 32. The curved web 30 of perch 24 has a substantially U-shaped or C-shaped cross section. The shape and dimensions of perch 24 may vary but have to provide a reliable and stable support for the caged bird.

Figure 3:
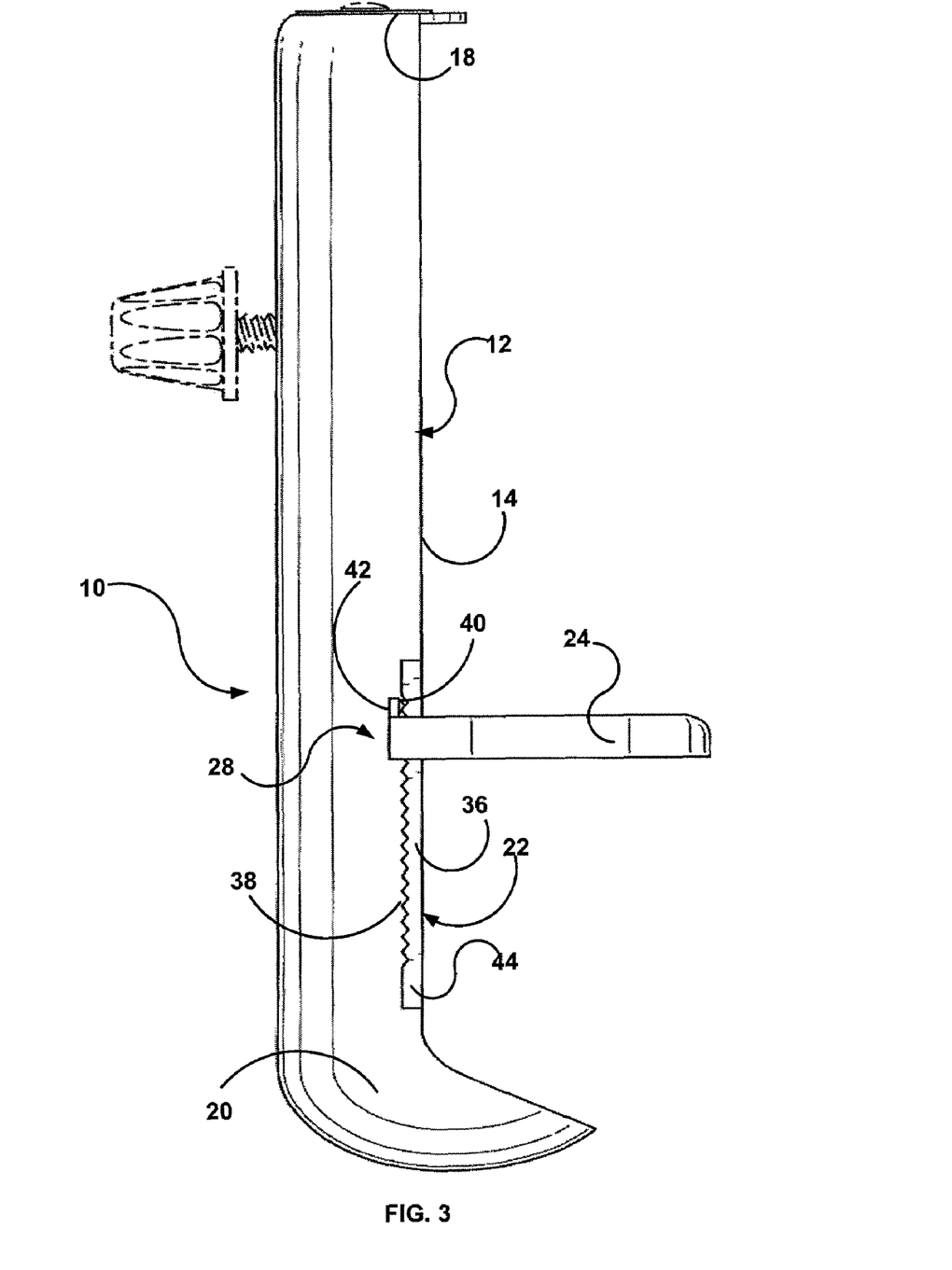
FIG. 3 is a side elevational view of the treat stick holder of FIG. 2.
Figure 6A:
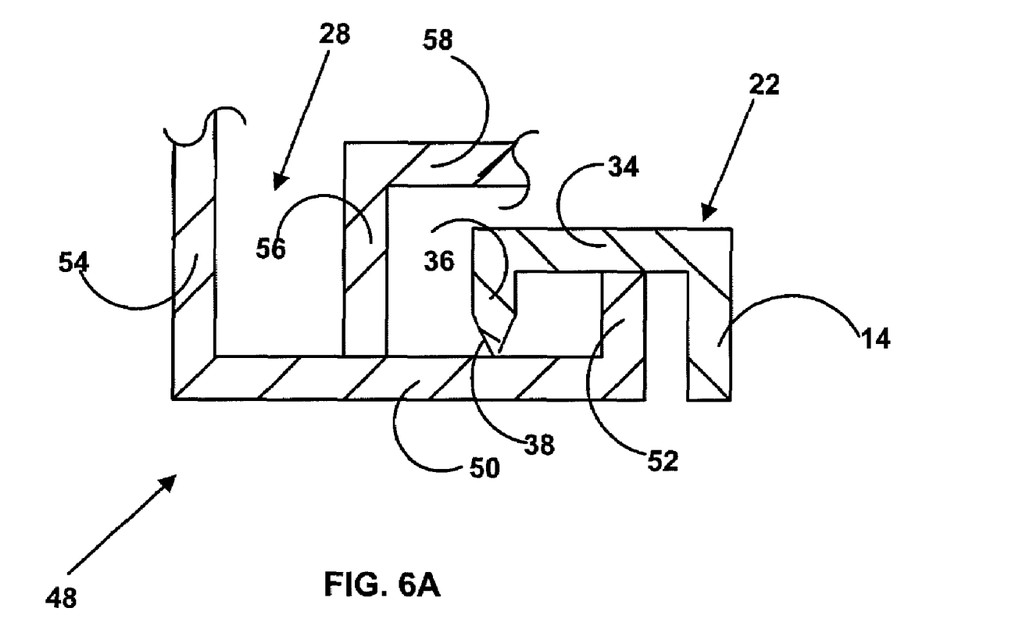
FIG. 6A is an enlarged cross-sectional view of an engaging unit between a track and a perch of FIGS. 1-5.

Referring to FIG. 3, tracks 22 extend parallel to longitudinal axis L-L (FIG. 1) of body 12 and each have a generally L-shaped cross section including a sidewall 36. The bottom surface of sidewall 36 is configured with a plurality of formations 38 that, as shown in FIG. 6A, engage respective ends 28, 32 of perch 24. The end 28 has a flange 42 with a raised stud 40 frictionally engageable between adjacent formations 38 as perch 24 slides along tracks 22 in response to a thrust applied by the operator. Upon ceasing the thrust in the desired position of perch 24, stud 40 is engaged between adjacent formations 38 and prevents voluntary displacement of the perch relative to body 12. The bottom ends 44 of respective tracks 22 each have a stop preventing perch 24 from sliding off the tracks and defining the lowest positions of the perch on the tracks.

Figure 4:
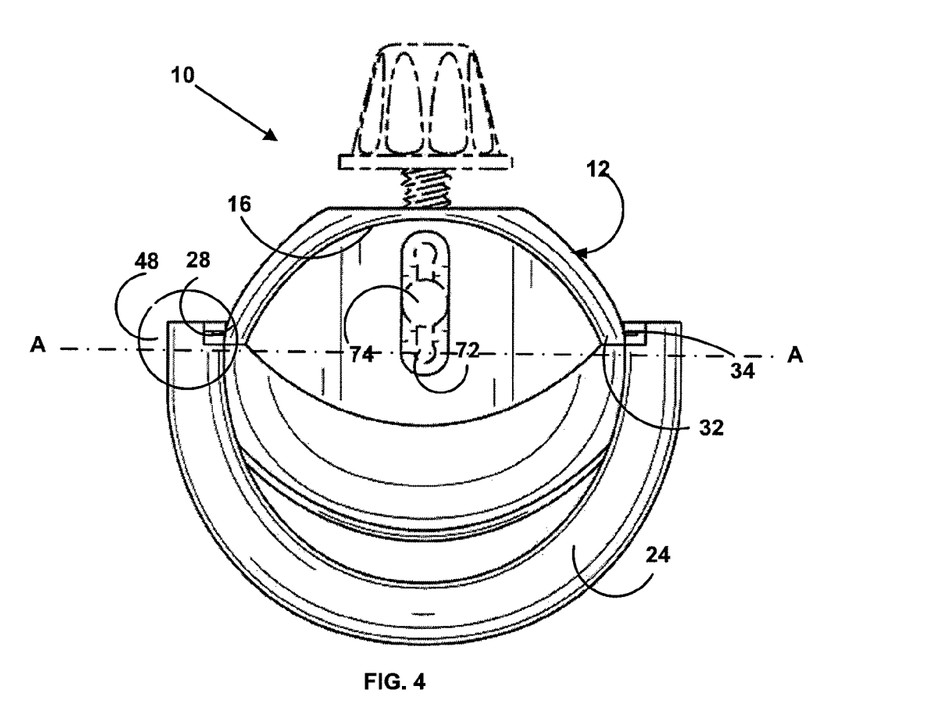
FIG. 4 is a top end elevational view of the treat stick holder of FIG. 1.
Figure 5:
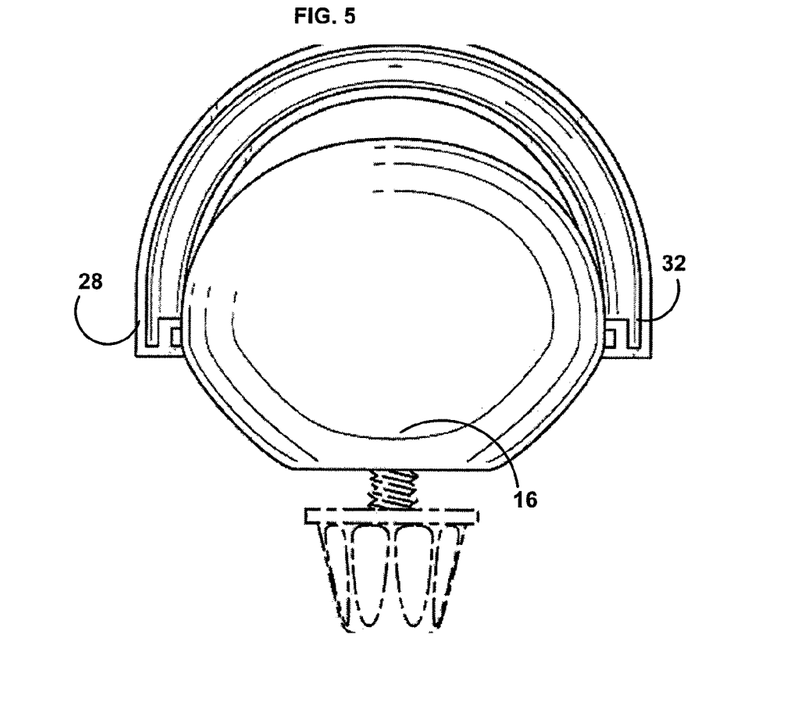
FIG. 5 is a bottom end elevational view of the treat stick holder FIG. 1 shown inverted relative to the stick holder of FIG. 4.

FIGS. 4 and 5 illustrate respective top end and bottom end views of treat stick holder 10. The holder 10 of FIG. 5 is shown inversed relative to the position of holder 10 of FIG. 4 upon rotating the holder at a 180° angle about an axis A-A of FIG. 4. Each track 22 and a respective one of perch ends 28, 32 define an engagement unit 48, as explained in detail immediately below and shown in FIG. 6A.

In engagement unit 48 of FIG. 6A, perch ends 28 and 32 each have a web 50 extending substantially parallel to longitudinal axis L-L (FIG. 1). A flank 52 is engaged between sidewall 36 of track 22 and flank 14 of body 12, and a further flank 54 extends upwards from the opposite end of web 50 substantially parallel to flank 52. The perch end 28 further has a side 56 located on web 50 between flanks 52 and 54 extends parallel thereto. It is angled at a substantially right angle to form a side 58 running generally parallel to web 50. The inner surface of base wall 34 of track 22 and the opposing outer surface of flank 52 of perch end 28, 32 slidably engage one another without generating substantial friction during displacement of perch 24 along tracks 22 due to low friction plastic material from which treat stick holder 10 is made.

Figure 6B:
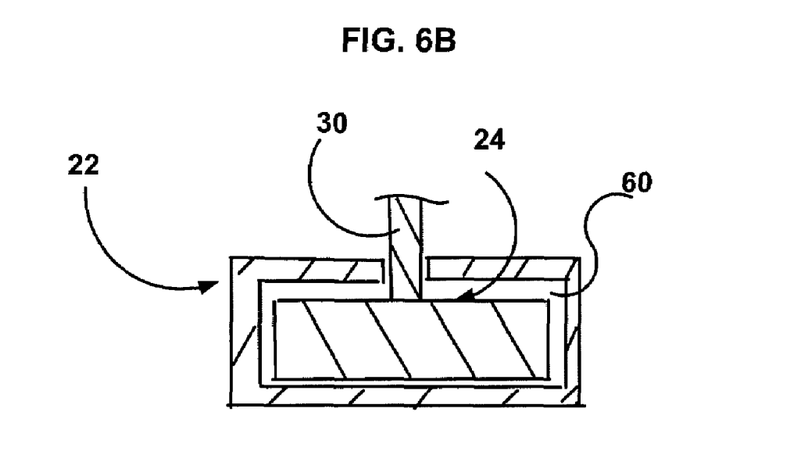
FIG. 6B is a modification of the engagement unit of FIG. 6A.

The engagement 48 may have various configurations. For example, the engaging ends of perch 24 and track 22 each may have engaging C-shaped or U-shaped complementary surfaces. In a further example, shown in FIG. 6B, tracks 22 each may have a rectangularly shaped cross-section with its outer side slotted to receive and guide web 30 of perch 24, which in turn, has opposite rectangular ends each guidable along a central channel 60 of guide 22. The opposing sides of the perch end and track 22 may have engageable formations configured to prevent voluntary displacement of perch 22 upon ceasing the external thrust.

Referring to FIGS. 1, 2 and 5, bottom end 20 of body 12 is configured to maximize trapping food debris. As seen in FIGS. 1 and 2, bottom end 20 is substantially dome-shaped and has a width "W" substantially equal to a distance between flanks 14 of body 12. The depth "D" of bottom end 20 is a distance between a central portion 63 (FIG. 1) of outer edge 65 of the bottom end 20 and bottom 16 of body 12. The ratio between the width W and depth D is about 1.5:1. Advantageously, the W/L ratio is about 1.3:1. The bottom end 12 is about between 1.2-3 inches wide and about between 0.75-2.5 inches deep. The radius of the spherical portion of the bottom end is about between 3/4 inches and 1.2 inches.

As shown in FIG. 1, bottom 16 of body 12 has a ribbed nut and washer system 26 allowing the operator to couple treat stick holder 10 to the birdcage. The system 26 has an outer nut detachably coupled to a threaded shaft extending from bottom 16 and dimensioned to protrude through a cage wall. The outer nut is then screwed onto the threaded shaft fixed to bottom 16 to reliably mount holder 10 to the birdcage.

Figure 8:
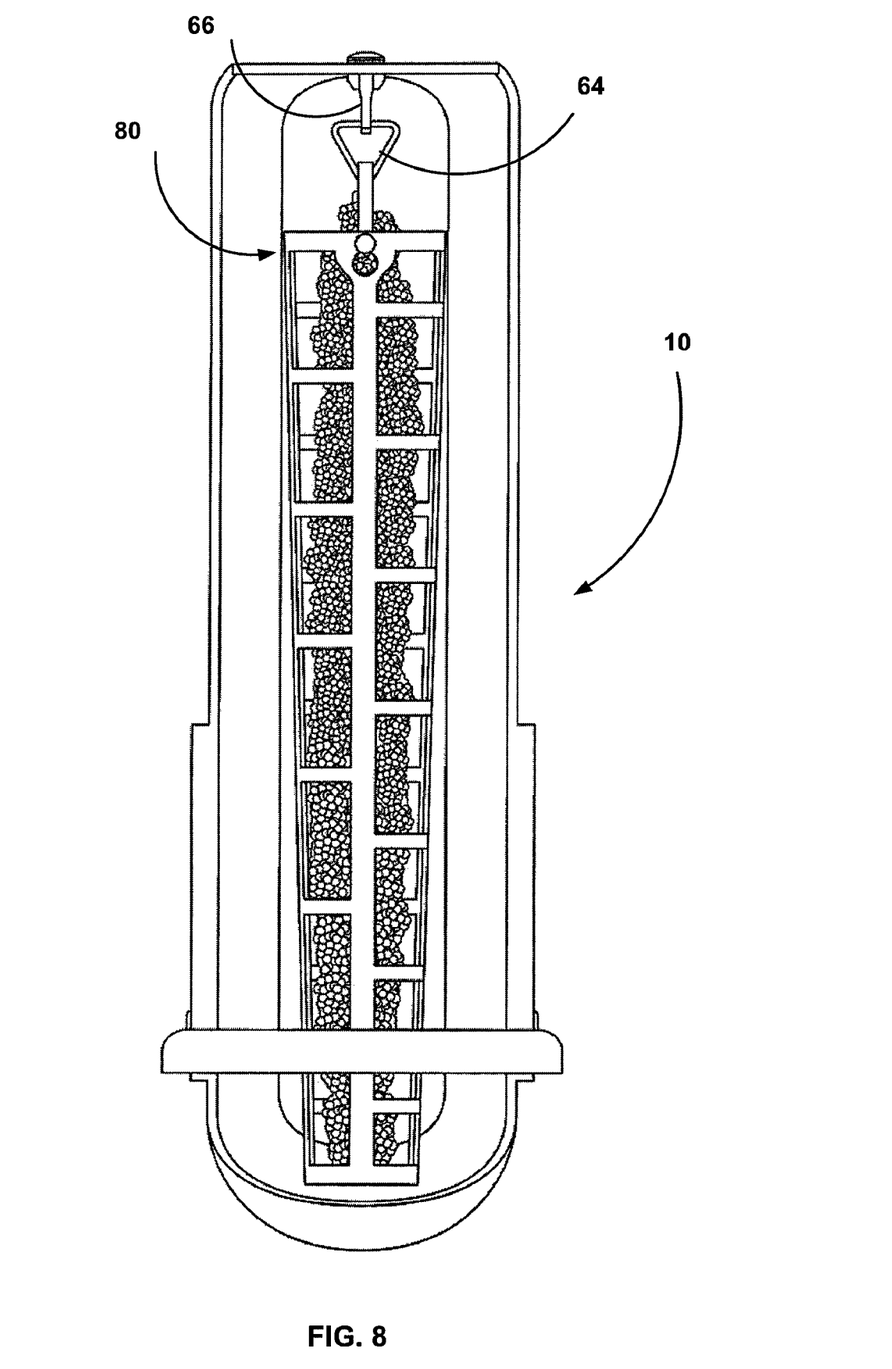
FIG. 8 is a plain front view of the treat stick holder of FIG. 1 in combination with the millet spray holder of FIG. 6A.

The utility of treat bone holder 10 is increased by configuring the holder so that it can receive and support a separate holder for a different type of food, such as a millet spray holder, as will be explained in reference to FIGS. 1, 4 and 8. As shown in FIG. 1, top body end 18 of holder 10 has a suspension unit 62 including a holder support 64 configured to engage millet spray holder 80 (FIG. 8). The holder support 64 (FIG. 1) may have various shapes including, for example, a polygonal or circular body, a hook or any other configuration allowing the operator to engage holder 10 with any other holder. The holder support 64 is mounted to top body end 18 so that support 64 can be easily displaced to a position convenient for the operator to engage two holders.

Structurally, for example, holder support 64 may have a pin 66 extendable through an elongated opening 72 (FIG. 4) of holder 10 from outside and provided with an enlarger outer end 74 which prevents pin 66 from falling through opening 72. The inner holed end 70 (FIG. 1) of pin 66 (FIG. 1) displaceably coupled to holder support 64. The opening 72 (FIG. 4) of body 12 is dimensioned to provide pin 66 with sliding motion along opening 72 so as to center millet spray holder 80 in treat stick holder 10 as illustrated in FIG. 8.

Figure 7:
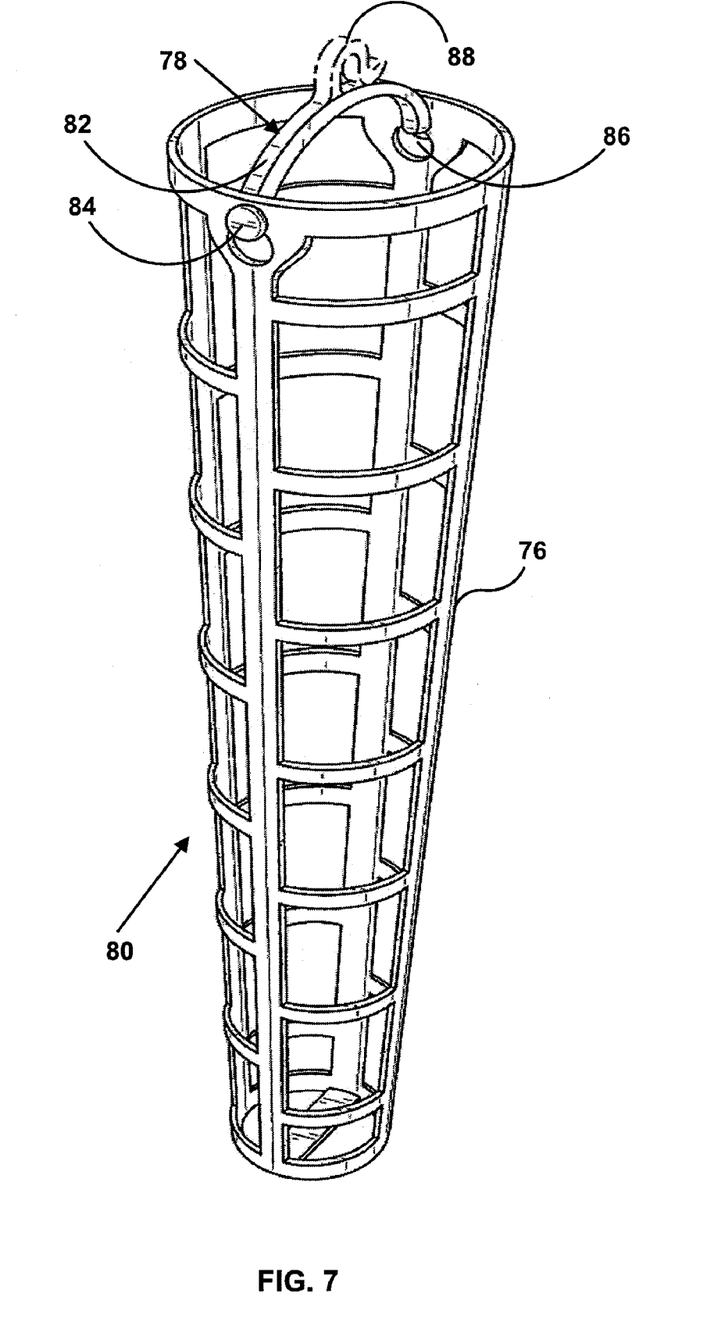
FIG. 7 is a perspective view of a millet spray holder.

The millet spray holder 80 may be used separately from treat stick holder 10. Referring to FIG. 7, millet spray holder 80 has an elongated frustoconical body 76 provided with a suspension unit 78. For example, suspension unit 78 is configured with an arcuate body 82 having opposite ends 84 each received in an 8-shaped opening 86 of millet spray body 80. The openings 86 each are configured with a lower opening sufficient to receive end 84 and an upper opening dimensioned to prevent end 84 from disengaging with body 76 of holder 80 upon suspending the latter to a support. The body 82 of suspension unit 78 further has a hook portion 88 which can be engaged to any support surface inside or outside the cage or, as shown in FIG. 8, to suspension unit 62 of treat bone holder 10.

FIGS. 9-12 illustrate a cuttlebone holder 110 configured in accordance with a further aspect of the present disclosure. Cuttlebone is the internal shell, or the spine of the cuttlefish is a good natural source of trace minerals, iron and calcium for a bird's diet. One side of the cuttlebone is hard, while the other is soft enough to insert the bird's beak into.

Figure 9:
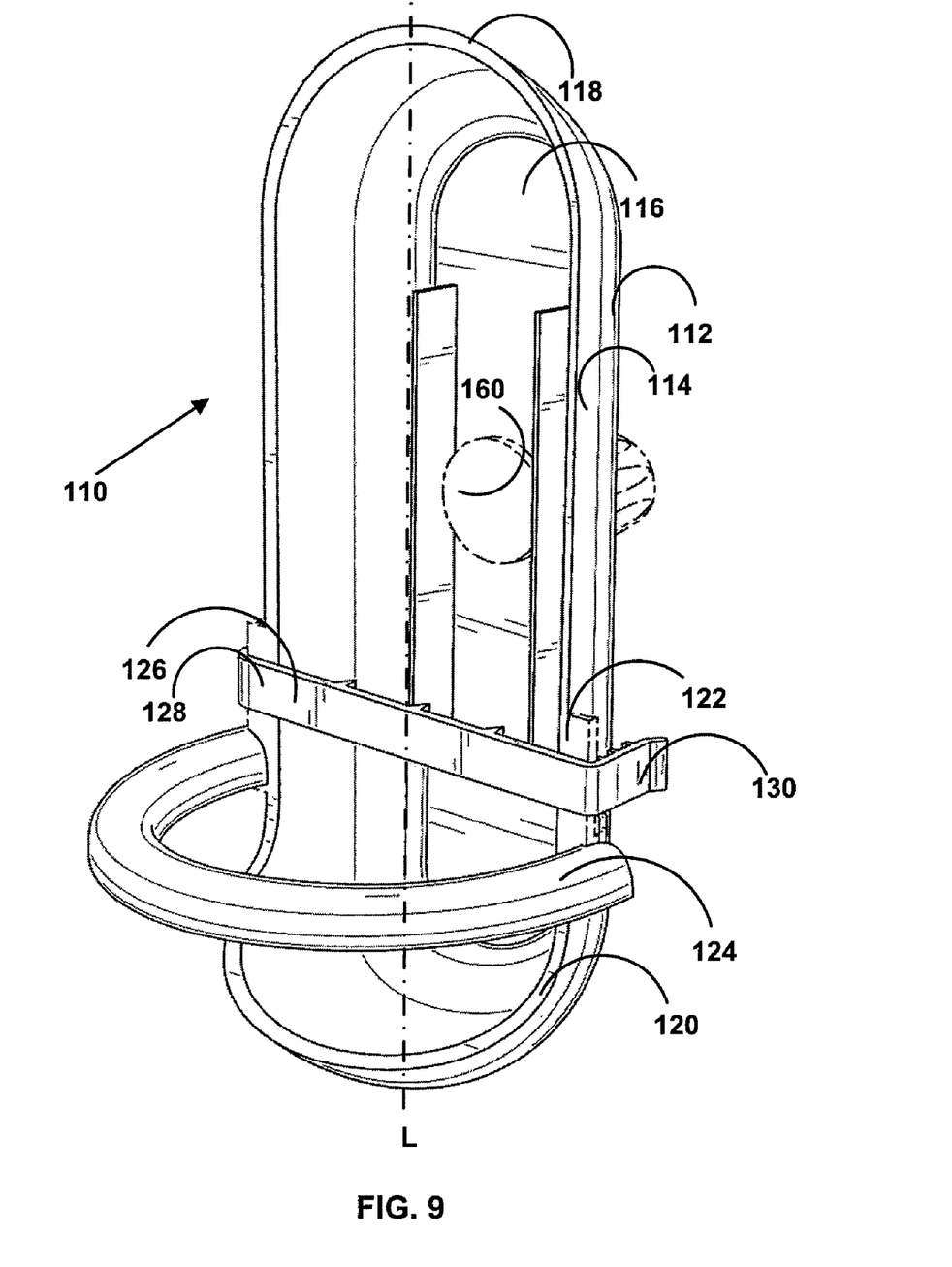
FIG. 9 is a perspective view of a cuttlebone holder with a bone holder shown in a locked position.
Figure 10:
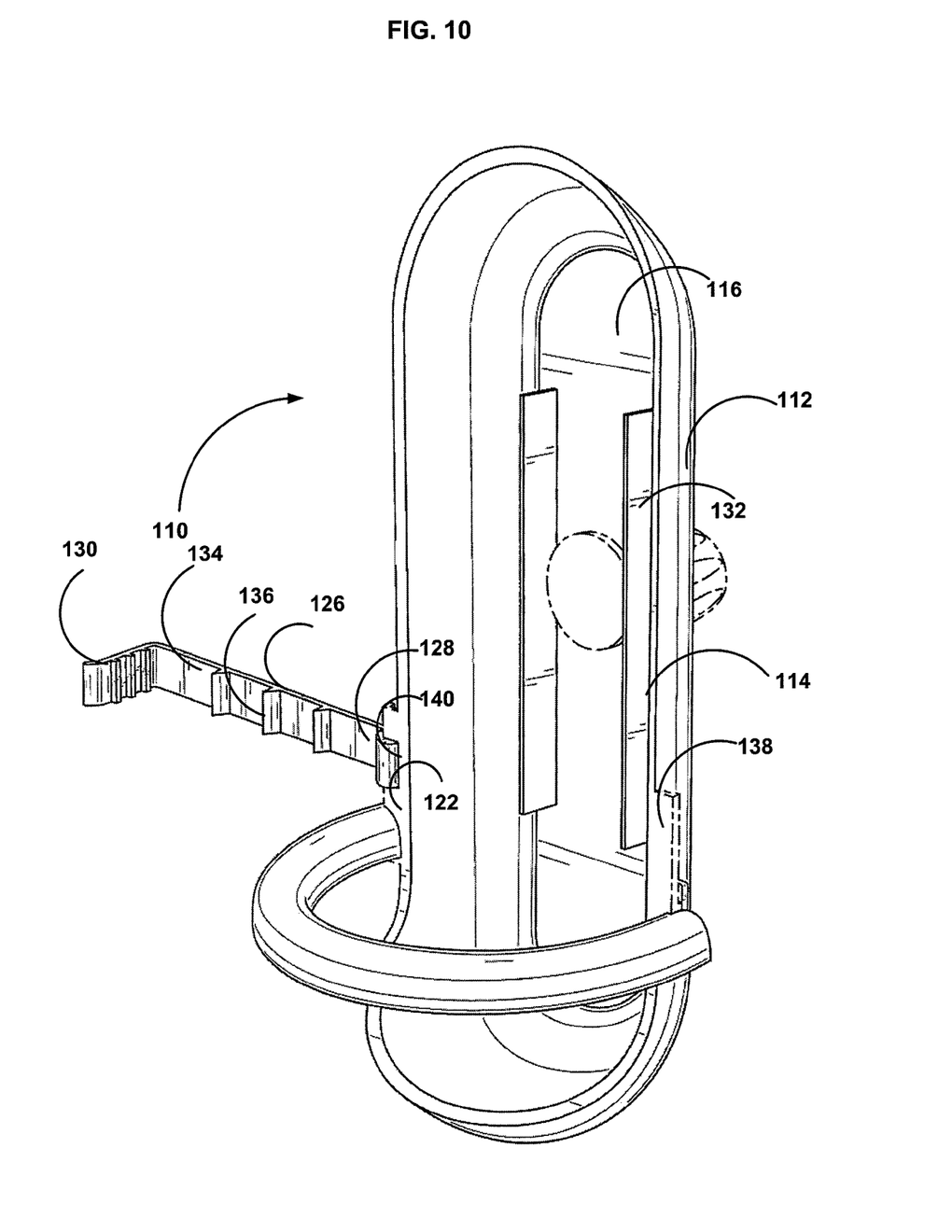
FIG. 10 is a perspective view of the cuttlebone holder of FIG. 9 with the bone holder shown in an unlocked position.

Referring to FIGS. 9 and 10, the cuttlebone holder 110 has an elongated body 112 extending along a longitudinal axis L-L and provided with a bottom 116 and a peripheral wall which extends angularly outward from bottom 116. The peripheral wall is configured with a pair of linearly extending flanks 114, a curved top end 118 bridging the upper ends of respective flanks 114, and a dome-shape bottom end 120 bridging the lower ends of respective flanks 114. Each flank 114 is provided with an elongated track 122 extending outwards from the outer edge of flank 114 and between bottom and top ends 120 and 118, respectively, of body 112.

The holder 110 is provided with a perch 124 bridging the lower ends of respective tracks 114. The perch 124 is configured to support the caged bird. The upper ends of respective tracks 122 are bridged by a cuttlebone holder strip 126 having one end 128, which is rotatably mounted to a respective one of tracks 122, and other end 130 detachably engaging the other track to prevent the cuttlebone from displacing in body 112. The operator may disengage cuttlebone holder strip 126, as shown in FIG. 10, and place a new bone into body 112 or clean the interior of body 112. The operator places the hard side of the cuttlebone on spacers 132 provided on bottom 116 (FIG. 10) and brings the cuttlebone holder strip over the cuttlebone. After applying a tensile force to strip 126, the operator engages strip end 130 with a respective one of tracks 122, as illustrated in FIG. 9.

Turning to FIG. 10, the inner surface of bone strip 126 (FIG. 9) has a series of formations 136 distributed along the length of holder strip 126. The central portion of inner surface 134 has formations 136 spaced at a relatively large distance from one another and configured to urge against and maybe even penetrate the outer relatively soft side of the cuttlebone. The formations 136 extending along strip end 130 are spaced from one another at a relatively small distance slightly larger than the thickness of track 122 and are selectively engageable therewith depending on the bone's dimensions.

Figure 11:
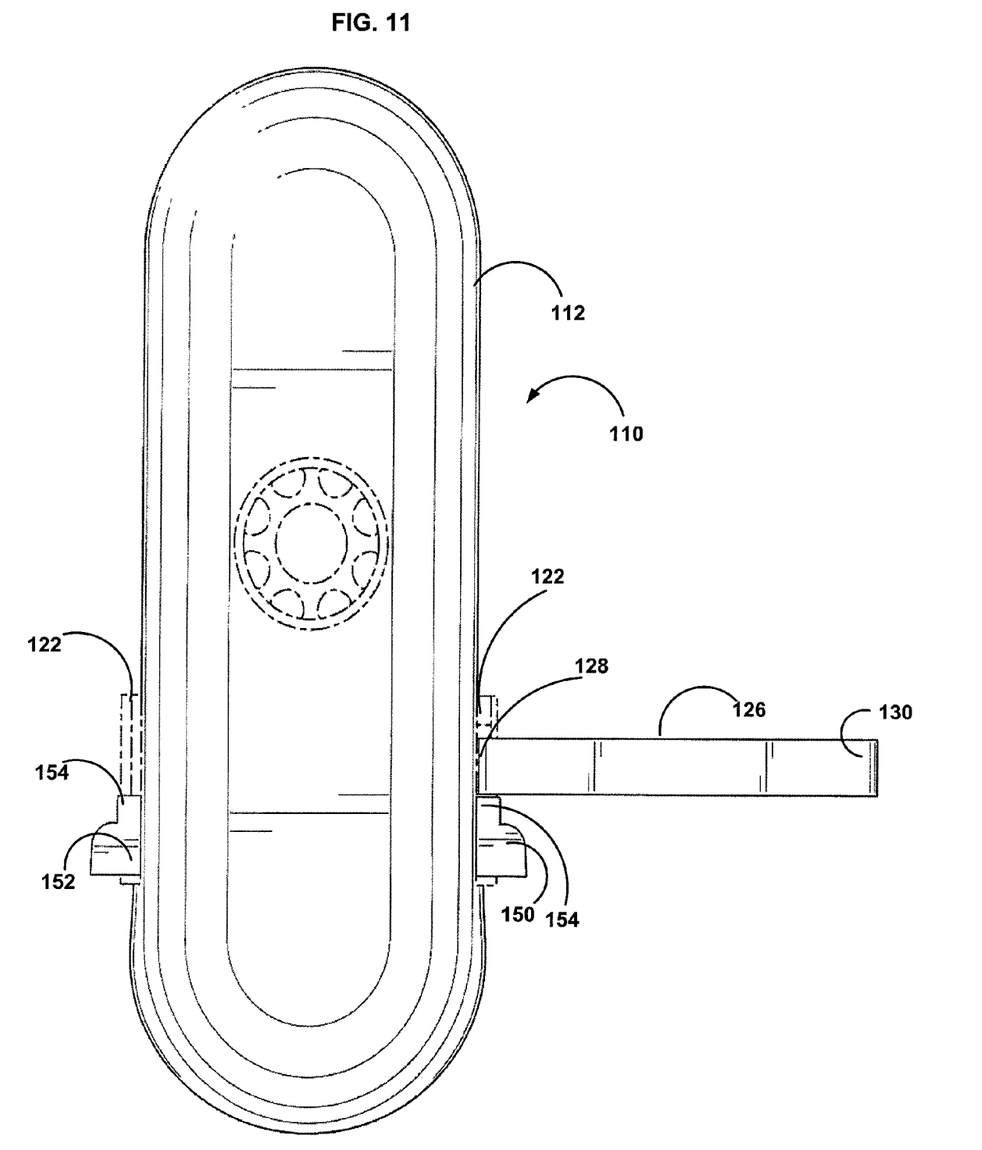
FIG. 11 is a rear view of the cuttlebone holder of FIGS. 9 and 10.

FIGS. 10 and 11 are illustrative of the configuration of tracks 122. One of the tracks 122 generally includes an element 138 removably engaging holder strip end 130. It has a substantially L-shaped cross-section with a base side extending outwards from flank 114 and sidewall extending from the outer edge of the base side downwards in a manner substantially similar to the tracks of FIGS. 1-6 and 8. The other track 122 has an intermediary section 140 (FIG. 10) configured as a shaft 144 (FIG. 11) onto which strip end 128 is hinged to provide holder strip 126 with rotational displacement to its open position, as shown in FIG. 10.

Figure 12:
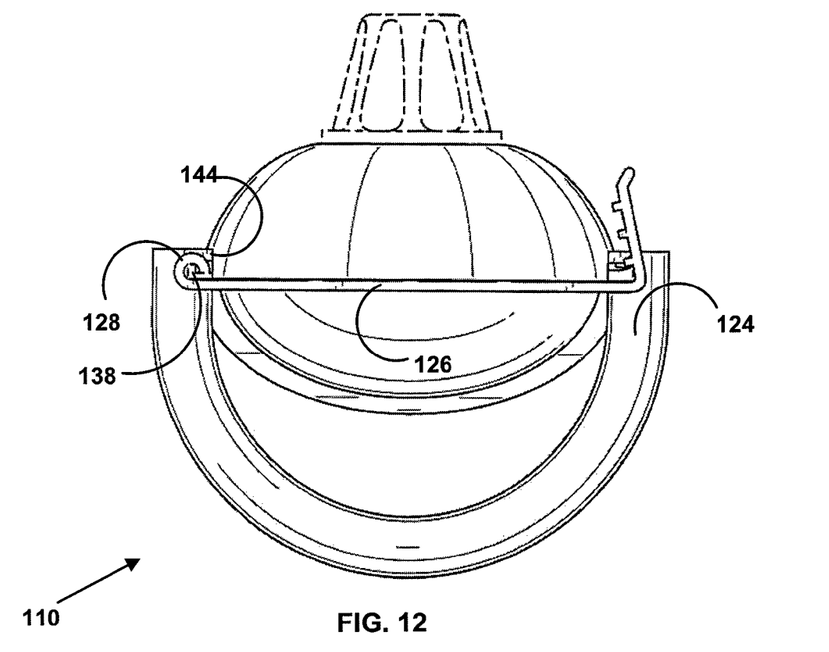
FIG. 12 is a front end elevational view of the cuttlebone holder of FIG. 9.
Figure 13:
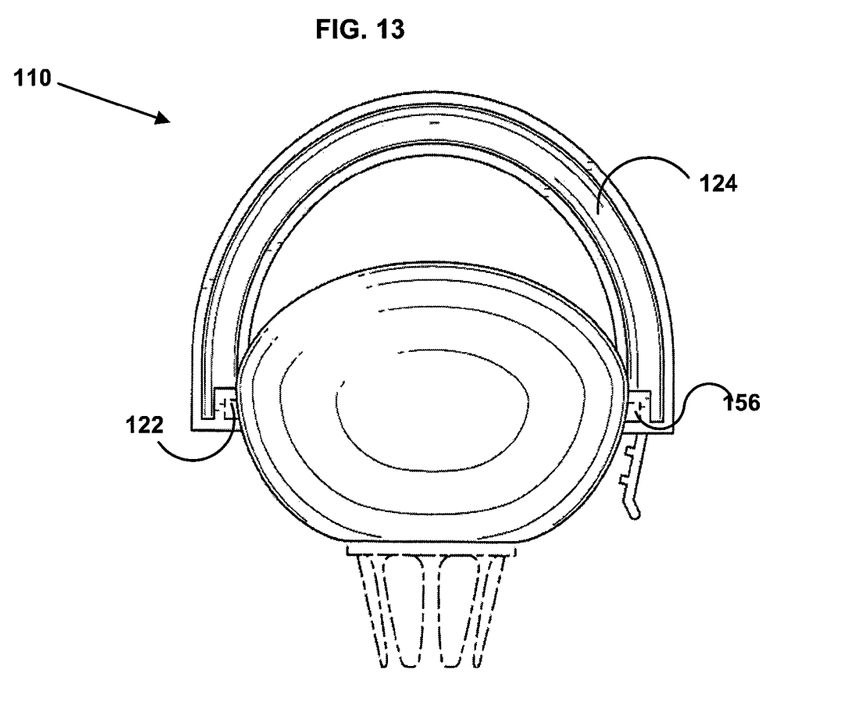
FIG. 13 is a bottom end elevational view of the cuttlebone holder of FIG. 9.

FIGS. 10-12 illustrate the configuration of perch 124 having an elongated arcuate body which is provided with a U-shaped cross section, as better shown in FIG. 12. The perch 124 including its opposite ends 150, 152 (FIG. 10) is configured similar to the perch of the treat stick holder of FIGS. 1-6 and 8. However, in contrast to the perch of the treat stick holder, perch 124 is configured so as to have only one end 152, located next to engageable end 130 of holder strip 126 in its closed position, slide along and off track 122 so as to provide an access to the interior of the body 112 of holder 110.

The other end 150 of perch 124 located next to rotatable end 128 of holder strip 126 (FIG. 10) is prevented from sliding along the respective track due to an extension 154 of end 150 which is in contact with hinged end 128 (FIG. 10). The bottom end of extension 154 is blocked from sliding off track 122 by a stop 156 (FIG. 12). To provide perch 124 with minimal play relative to body 112, tracks 122 each have an enlarged region (not shown) next to the bottom end of track 122 and frictionally tightly engaging end 150, 152 of perch 124. The engagement between tracks 122 and respective ends 150 and 152 of perch 124 provides a stable support for the caged bird. When unhindered access to the interior of body 112 is desirable for cleaning body 112 or placing a new bone, the operator applies a thrust sufficient to overcome frictional coupling between perch end 152 and track 122 and move perch end 152 along track 122 after holder strip end 130 has been disengaged from this track. The operator then may bend disengaged perch end 150 away from body 112 and proceed with the task.

The bottom body end 120 is configured substantially similar to the bottom end of the treat stick holder of FIGS. 1-6 and 8 and thus has the increased capacity to trap food debris. The cuttlebone holder 110 is detachably coupleable to a cage by means of a ribbed nut and washer system 160 (FIG. 9) configured similar to the ribbed and nut system of the treat stick holder, as discussed in reference to FIGS. 1-6 and 8.

In summary, the above disclosed holders have, among others, the following features.

A birdcage accessory for holding a food item including, but not limited to treat sticks, cuttlebones, bars and the like has:
a body shaped and dimensioned to receive and store the food item; and
a perch coupled to the body so that the perch and the body are displaceable relative to one another to provide an operator with an unhindered access to an interior of the body.

The birdcage accessory as previously characterized is a treat stick holder, wherein the body has opposite elongated flanks, the perch slidably engaging the flanks to slide between a plurality of desired positions in which a caged bird can reach for the food item, each of the desired positions corresponding to a varying length of the food item as the food item is being consumed by a caged bird.

The treat stick holder as previously characterized, wherein the flanks each provided with a track, opposite ends of the perch frictionally engaging the respective tracks so as have the perch and the body slide relative to one another to the desired position in response to a thrust applied by the operator.

The treat stick holder as previously characterized, wherein the perch has a substantially U-shaped cross-section configured to provide a support for the caged bird, the opposite ends of the perch having respective slots each configured to slidably receive the flank.

The treat stick holder as previously characterized, wherein the slots each have a substantially U-shaped cross-section, at least one the opposite ends of the perch having a flange provided with a stopper engaging an end stud provided on a respective one of the tracks and configured to prevent complete disengagement between the perch and the track but allow displacement of the perch along the tracks.

The treat stick holder as previously characterized, wherein the flanks each have an L-shaped cross-section including a base wall and a side wall, the base wall extending outwards from the body and a side wall extending transversely to the base wall, the tracks each being provided on the side wall and the studs each being mounted to at least one of opposite end portions of the base wall.

The treat stick holder as previously characterized, wherein the tracks each have a plurality of teeth frictionally engageable in the respective slots of the perch to prevent voluntary displacement between the perch and the body.

The treat stick holder as previously characterized, wherein the body has a food fragments trap on one of opposite body ends, the trap extending from a bottom of the body beyond the flanks and configured to collect food debris.

The treat stick holder as previously characterized, wherein the trap has a substantially dome-shaped cross-section and provided with a width ranging between about 1.5 and 3 inches, a depth ranging between about 1 inches and 3 inches and a radius ranging between about 0.75 inches and 1.5 inches, the width being defined between the flanks of the body, the depth being defined between the bottom of the body and an outer edge of the trap.

The treat stick holder as previously characterized, wherein the width is about 2.5 inches, the depth is about 2 inches and the radius is about ¾ inches.

The treat stick as previously characterized, wherein the body further has a peripheral wall, extending angularly from the bottom of the body and including the flanks, and a top opposite the trap and bridging the opposite flanks.

The treat stick as previously characterized, wherein the top portion of the body has a suspender unit operative to provide a support for a millet spray, the millet spray holder being configured to extend within the body and detachably coupled to the suspender unit.

The treat stick as previously characterized, wherein the millet spray holder has a hook unit detachably coupled to a top of the millet spray holder and coupleable to the suspension unit.

The treat stick as previously characterized, further has a mounting unit configured to detachably couple the body to a cage wall.

The birdcage accessory as previously characterized is a cuttlebone or bar holder, wherein the body is provided with a bottom and a peripheral wall extending angularly outwards from the body and including opposite longitudinal flanks.

The cuttlebone holder as previously characterized, further has two tracks extending along and coupled to the respective flanks, opposite ends of the perch being configured to detachably couple to respective flanks.

The cuttlebone holder as previously characterized, further has a bone holder having opposite holder ends, one of the holder ends being mounted to a respective one of the tracks, the other holder end being flexible and provided with a plurality of spaced apart projections selectively engaging the other track so as to provide adjustment of a length of the bone holder according to various shapes and dimensions of the food item.

The cuttlebone holder as previously characterized, wherein the other holder end extends angularly to a web portion extending between the opposite bone holder ends, the projections being spaced apart at a distance slightly greater than a width of the other track, the other track being received between adjacent teeth upon tightening the web of the bone holder against the food item.

The cuttlebone holder as previously characterized, wherein the one holder end of the bone holder being rotatably mounted to the one track so as to provide the operator with an access to an interior of the body upon swinging away from the body in response to a torque by the operator.

The cuttlebone holder as previously characterized, wherein the tracks each have a generally L-shaped cross-section including a base wall and a sidewall, the base wall extending from body and the sidewall being spaced from the body and extending transversely to the base wall.

The cuttlebone holder as previously characterized, wherein the one track is provided with an intermediary section having a substantially circular cross-section of a reduced diameter, the one end of the bone holder being rotatably mounted on the intermediary section of the one track.

The cuttlebone holder as previously characterized, wherein the web of the bone holder has a toothed inner surface engaging the food item so as to prevent inadvertent displacement of the food item.

The cuttlebone holder as previously characterized, further has a pair of spacers extending from the bottom of the body and configured to urge against the food item.

The cuttlebone holder as previously characterized, wherein the body has a trap on one of opposite body ends, the trap extending from a bottom of the body beyond the flanks and configured to collect food debris.

The cuttlebone holder as previously characterized, wherein the trap has a substantially dome-shaped cross-section and provided with a width ranging between about 1.5 and 3 inches, a depth ranging between about 1 inches and 3 inches and a radius ranging between about 0.75 inches and 1.5 inches, the width being defined between the flanks of the body, the depth being defined between the bottom of the body and an outer edge of the trap.

The cuttlebone holder as previously characterized, wherein the width is about 2.5 inches, the depth is about 2 inches and the radius is about ¾ inches.

While the invention has been described in conjunction with specific embodiments, it is to be understood that many alternatives, modifications and variations will be apparent to those skilled in the art in light of the foregoing description.

What is claimed is:

1. A birdcage accessory for holding a food item, the birdcage accessory comprising:
    a body shaped and dimensioned for receiving and storing the food item in an interior of the body, the body and the interior having a common longitudinal axis; and
    a perch coupled to the body, the perch being displaceable along the longitudinal axis relative body for providing a bird with an unhindered access to the interior of the body, the perch having being substantially perpendicular to the longitudinal axis; wherein the body comprises opposite elongated flanks, the perch slidable engaging the flanks to slide between a plurality of desired positions for the bird to reach for the food item, each of the desired positions corresponding to a varying length of the food item as the food item is being consumed by the bird; wherein the body comprises a food fragments trap on one of opposite body ends, the trap extending from a bottom of the body beyond the flanks and configured to collect food debris; wherein the trap comprises a substantially dome-shaped cross-section and a width between 1.5-3 inches, a depth between 1-3 inches and radius between 0.75-1.5 inches, the width being defined between the flanks of the body, the depth being defined between the bottom of the body and an outer edge of the trap.

2. The birdcage accessory of claim 1, wherein at least one of the flanks comprises a track, an engaging end of the perch frictionally engaging the respective track for sliding the perch and the body relative to one another to the desired position.

3. The birdcage accessory of claim 2, wherein the perch comprises a substantially U-shaped cross-section for supporting the bird, the engaging end of the perch comprising a slotted side configured to slidably receive the flank.

4. The birdcage accessory of claim 1, wherein the body comprises a peripheral wall extending angularly from the bottom of the body and including the flanks, and a top opposite the trap and bridging the opposite flanks.

5. The birdcage accessory of claim 1, wherein the body comprises a bottom and a peripheral wall extending angularly outwards from the body and including opposite longitudinal flanks.

6. The birdcage accessory of claim 5 further comprising tracks extending along and coupled to the respective flanks, opposite ends of the perch being configured to detachably couple to respective flanks.

7. The birdcage accessory of claim 6, herein the tracks each have a generally L-shaped cross-section including a base wall and a sidewall, the base wall extending from body and the sidewall being spaced from the body and extending transversely to the base wall.

8. A birdcage accessory for holding a food item, the birdcage accessory comprising:
    a body shaped and dimensioned for receiving and storing the food item; and
    a perch coupled to the body, the perch and the body being displaceable relative to one another for providing a bird with an unhindered access to an interior of the body;
    wherein the body comprises opposite elongated flanks, the perch slidably engaging the flanks to slide between a plurality of desired positions for the bird to reach for the food item, each of the desired positions corresponding to a varying length of the food item as the food item is being consumed by the bird;
    wherein at least one of the flanks comprises a track, an engaging end of the perch frictionally engaging the respective track for sliding the perch and the body relative to one another to the desired position;
    wherein the perch comprises a substantially U-shaped cross-section for supporting the bird, the engaging end of the perch comprising a slotted side configured to slidably receive the flank; and
    wherein the slotted side comprises a substantially U-shaped cross-sectional area, the engaging end of the perch comprising a flange provided with a stopper engaging an end stud provided on the track and configured to prevent complete disengagement between the perch and the track but allow displacement of the perch along the track.

9. The birdcage accessory of claim 8, wherein the flank comprises an L-shaped cross-section; the L-shaped cross-section comprising a base wall and a side wall, the base wall extending outwards from the body and a side wall extending transversely to the base wall, the track being provided on the side wall and the end stud being mounted to an end portion of the base wall.

10. The birdcage accessory of claim 8, wherein the track comprises a plurality of teeth frictionally engageable in the slotted side of the perch to prevent voluntary displacement between the perch and the body.

11. A birdcage accessory for holding a food item, the birdcage accessory comprising:
    a body shaped and dimensioned for receiving and storing the food item;

a perch coupled to the body, the perch and the body being displaceable relative to one another for providing a bird with an unhindered access to an interior of the body;

a bone holder, the bone holder comprising opposite holder ends, a first of the holder ends being mounted to a respective one of the tracks, a second of the holder ends being flexible and provided with a plurality of spaced apart projections selectively engaging the other track so as to provide adjustment of a length of the bone holder according to various shapes and dimensions of the food item;

tracks extending along and coupled to the respective flanks, opposite ends of the perch being configured to detachably couple to respective flanks;

wherein the body comprises a bottom and a peripheral wall extending angularly outwards from the body and including opposite longitudinal flanks.

12. The birdcage accessory of claim 11, wherein the second of the holder ends extends angularly to a web portion that extends between the first and second of the holder ends, the projections being spaced apart at a distance slightly greater than a width of the other track, the other track being received between adjacent teeth upon tightening the web of the bone holder against the food item.

13. The birdcage accessory of claim 12, wherein the one holder end of the bone holder being rotatably mounted to the one track to provide an operator with an access to the interior of the body upon swinging away from the body in response to a torque by the operator.

14. The birdcage accessory of claim 11, wherein a web of the bone holder has a toothed inner surface engaging the food item so as to prevent inadvertent displacement of the food item.

* * * * *